United States Patent [19]
Katz et al.

[11] Patent Number: 5,580,140
[45] Date of Patent: Dec. 3, 1996

[54] DEVICE FOR THE PRESENTATION OF IMAGES TO THE PASSENGERS OF MOVING VEHICLES

[75] Inventors: Burkhard Katz, Overatz, Germany; Susan K. Summer, Warren, Conn.

[73] Assignee: Dimensional Media Associates, New York, N.Y.

[21] Appl. No.: 19,262

[22] Filed: Feb. 16, 1993

(Under 37 CFR 1.47)

[30] Foreign Application Priority Data

Feb. 18, 1992 [DE] Germany ............................ 42 04 821.4

[51] Int. Cl.[6] ............................................................. G03B 21/00
[52] U.S. Cl. ................................... 353/13; 353/28; 353/62
[58] Field of Search .................................. 353/11, 12, 13, 353/14, 28, 62, 79, 80

[56] References Cited

U.S. PATENT DOCUMENTS 5,114,224  5/1992  Miyamoto et al. ...................... 353/122
5,276,523  1/1994  Kurematsu et al. ..................... 353/101
5,455,647  10/1995  Fujiwara ................................. 353/101

FOREIGN PATENT DOCUMENTS 0015244  8/1928  Australia ................... 353/13
0032465  1/1928  France ....................... 353/13
0638986  6/1928  France ....................... 353/62
1208089  2/1960  France ....................... 353/13

*Primary Examiner*—William Dowling
*Attorney, Agent, or Firm*—Kolisch, Hartwell, Dickinson, McCormack & Heuser

[57] ABSTRACT

A method and apparatus for projecting images, advertisements and the like to passengers of moving vehicles. A projector is placed on the vehicle and it projects an image on the walls of a train tunnel, clouds near an airplane, etc. as the vehicle moves. A technique is provided for correcting distortion caused by the positional changes between the vehicle and the projection surface.

17 Claims, 3 Drawing Sheets

DEVICE FOR THE PRESENTATION OF IMAGES TO THE PASSENGERS OF MOVING VEHICLES

TECHNICAL FIELD

This invention relates to a method for projecting images onto a surface moving relative to a viewer and more specifically, a surface moving relative to a vehicle in which the viewer is located. Another embodiment concerns laser light displays for a moving viewer.

DESCRIPTION OF THE PRIOR ART

Trains, buses, airplanes, etc. are often used as settings in which to advertise. In a subway train car, for example, signs are normally attached to an area of a subway car wall above the windows. As the passengers sit or stand on the train, they view the images and read the advertisements. Additionally, at the subway stations, large poster type signs are typically attached to the station walls. These poster images are viewable to the waiting passengers only during the time that they wait for their train or, once on board a train, only during the time that the train is stopped in that station.

Additionally, these static advertisements and large poster type advertisements in the train stations are conventional and do not optimally attract consumer attention.

In view of the above, it can be appreciated that there exists a need for a more eye-catching method and apparatus for displaying projected video images, and laser light displays and specifically, advertisements, to passengers of moving vehicles.

SUMMARY OF THE INVENTION

The above and other limitations of the prior art are overcome in accordance with the present invention which relates to an improved technique for displaying advertisements or other images to passengers of a moving vehicle. In accordance with the teachings of the present invention, a projector is mounted on the outside wall of the vehicle and a display surface in the form of a tunnel wall in the case of a train, body of water in the case of a ship, or other preexisting surface, is utilized as the projection screen.

In the case of a subway train, as the train moves through the tunnel, an image which may be a video image from a conventional or laser projector is projected onto the wall of the tunnel and is viewable by the passengers within the vehicle. Means are provided to reorient the projector, thereby adjusting the location of the image, as the relative position of the tunnel wall changes with respect to the vehicle. A correcting lens arrangement and/or other optics are optionally utilized to correct any distortion caused by the irregular shape of the tunnel wall.

DETAILED DESCRIPTION OF THE PREFERRED EMBODIMENT

Figure 1:
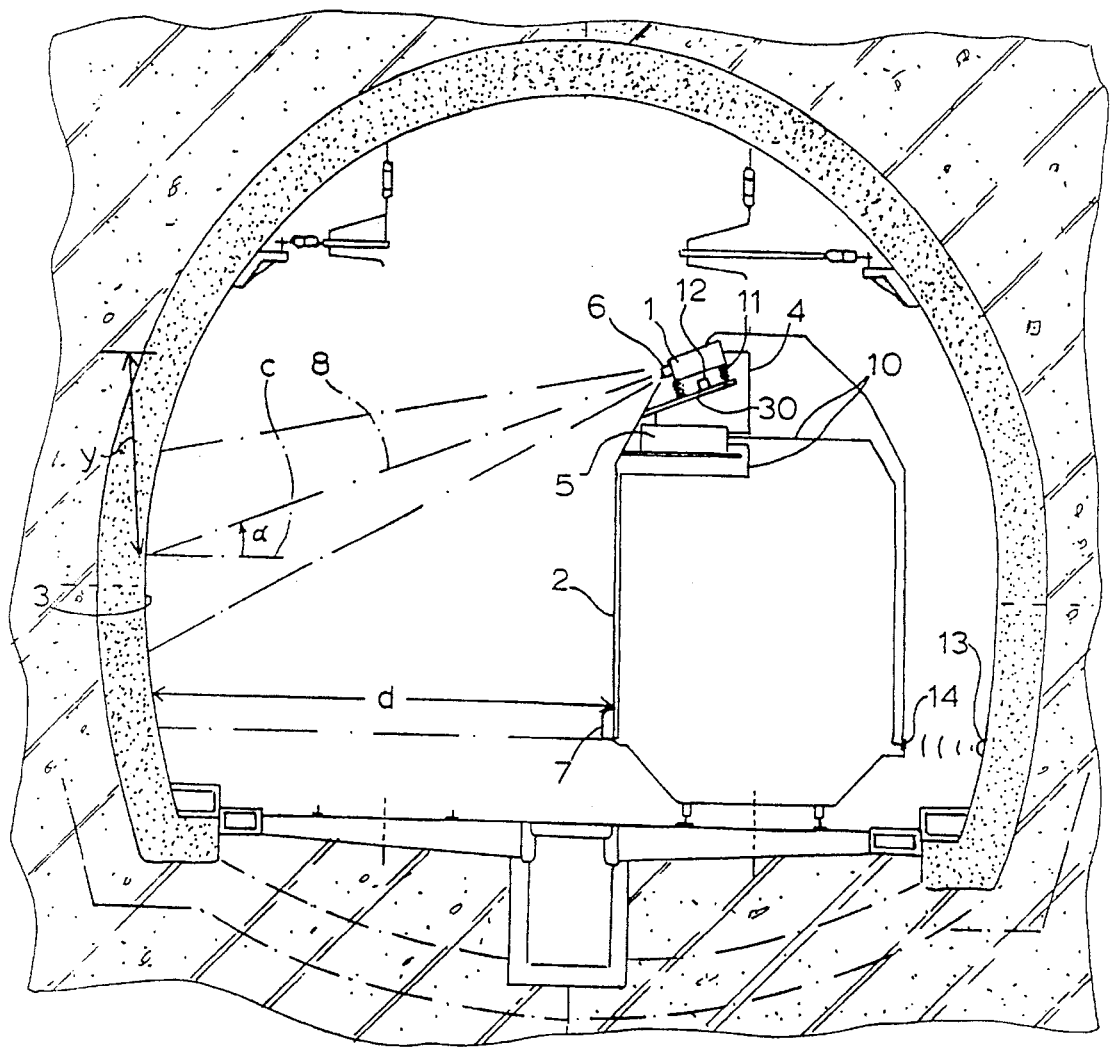
FIG. 1 is a longitudinal view of an exemplary train vehicle within a tunnel with the present invention implemented thereon.

FIG. 1 shows a subway vehicle 2 for use in practicing the present invention.

Figure 2:
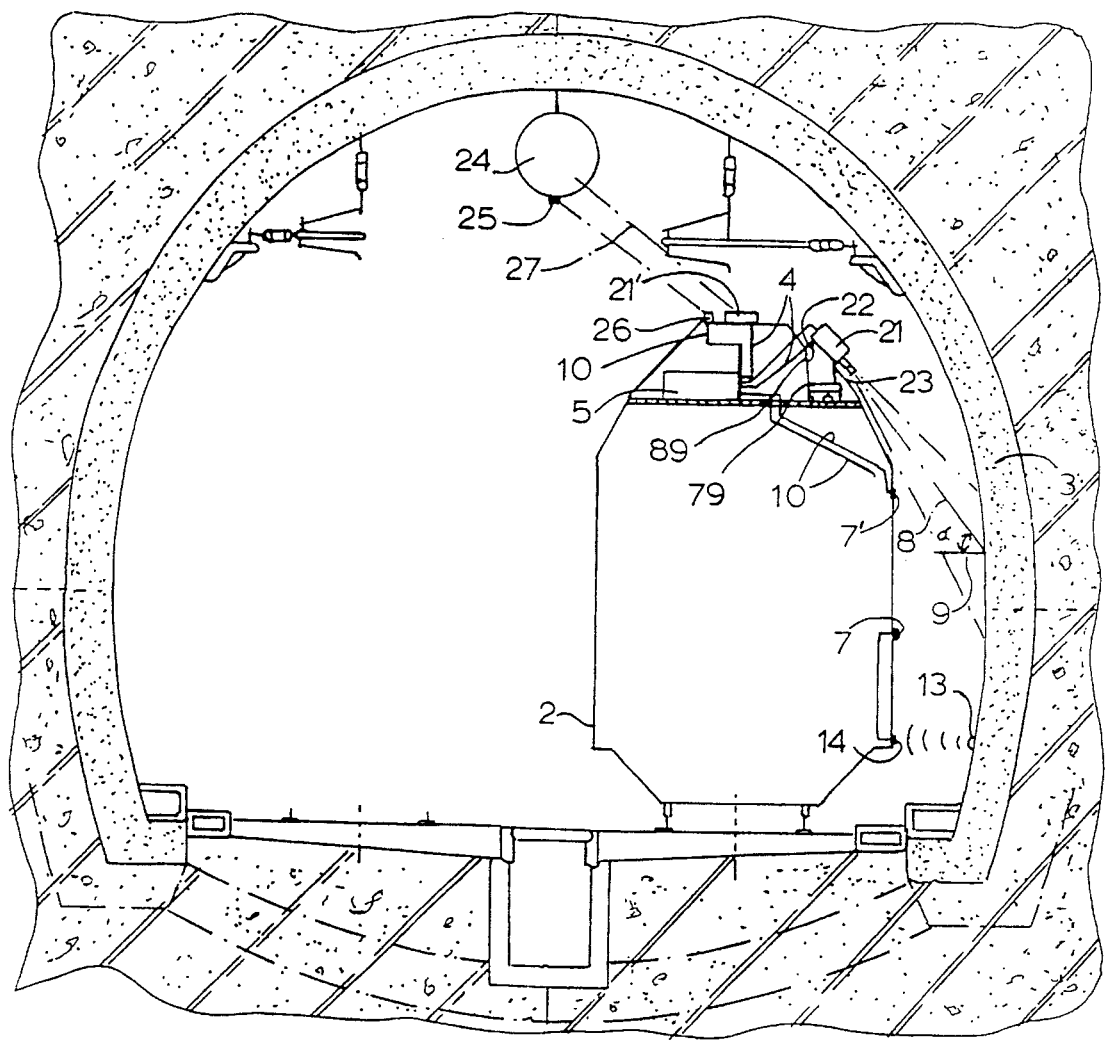
FIG. 2 is a longitudinal view of a different embodiment of the present invention, implemented on a subway train, utilizing laser optics.

The arrangement of FIG. 2 includes a projector 1 mounted on springs 11 and shock absorbers 12, and connected to the upper portion of the vehicle as shown. A digital guidance unit 5 assists steering line 4 to effectuate movement of the camera in accordance with known techniques. The steering line 4 is a mechanical link for physically moving the projector, or may be an electrical link for signaling a lens arrangement in the projector to move. Thus, the camera can be aimed at the tunnel wall and at the proper angle as indicated so that the image remains at eye level for the passengers.

In operation, the train travels through the tunnel in the direction perpendicular to the plane of FIG. 1. A suitable advertisement or other image is installed within the projector 1 which is activated, thereby displaying the image on the tunnel wall 3. The angle, alpha, between the horizontal and the center of the projected beam 8 is varied depending upon the distance d between the train 2 and the tunnel wall 3 in order to maintain the image at the proper height for viewing by the passengers. The angle alpha is adjusted so that the height is correctly aligned with the proper viewing area through the windows of the train 2.

The varying of the angle alpha is accomplished in the following manner. A distance measuring device 7 is mounted on the wall of the train. Although FIG. 1 shows the distance measuring device 7 mounted at the bottom of the train, it of course may be placed in any convenient location on the train. The distance measuring device may be constructed using radar or sonar principles, electromagnetic fields, or any other technique, all of which are well known in the art. Such devices are widely used in numerous fields of endeavor.

As the train moves through the tunnel, the distance d will vary slightly and the distance measuring device 7 will detect such variations. The variations are then digitized and transmitted to the guidance unit 5. A microprocessor, either in the guidance unit 5 or other location, is utilized to then calculate the required adjustment of the angle alpha in order to maintain the image at the proper height on the tunnel wall 3. Well known trigonometric rules are implemented by the microprocessor to adjust the angle alpha. If y is the distance between the projector height and the desired viewing height, then alpha is arctan (y/d). The physical movement can be accomplished by simply moving platform 30.

The distance measuring device 7 should preferably be placed toward the front of the train with the projector 1 well behind it. The angle adjustment is delayed for the proper time period after the distance measuring device 7 detects a change in distance. Thus, by the time the projector 1 reaches the point on the tunnel where the distance has changed, the appropriate adjustment will have been made. The proper time delay t for projector adjustment is a function of the distance x between the projector 1 and distance measuring device 7, as well as the speed v of the train. (t=x/v) Both parameters are readily available for input to the digital guidance unit and analysis thereby.

It is also noted that rather than tilting the entire projector 1, a directionally projecting lens system 6 can be utilized with the angle alpha being adjusted by changing the parameters of such a lens system in accordance with well known techniques for such optical systems. In this case however, an interface between the lens system and the digital guidance unit 5 is required, making the system more costly.

In some instances, a tunnel wall 3 may have significant constant curvature in the area of the projected image. In such a case, a rectifying lens is permanently placed upon the front of the projector 1. The rectifier lens curves the focal plane of the projector so that it matches the curve of the tunnel wall. It is well known to persons skilled in the art to implement such an adjustment where the curvature of the tunnel wall is likely to remain substantially constant throughout the length of the train's trip.

For the digital guidance unit 5, a personal computer with memory chips is well suited for the recording of the necessary data transmission and guidance software, as well as performing the calculations necessary to determine the proper angle alpha. For this use, the personal computer can be equipped with the appropriate electronics interface for reception of the measurement signals and transmission of the guidance signals.

An additional enhancement to the invention allows the projector apparatus to automatically turn on and off at the beginning and end of the train route, or at the beginning and end of a specified portion of the train route. In accordance with the invention, a signal emitter 13 is placed at the portion of the tunnel where it is desired to activate the projecting apparatus. As the train passes by the emitter 13, a small detector 14 installed on the vehicle detects the emissions and transmits an electrical signal up to the projector 1, digital guidance unit 5, and distance measuring device 7 to activate them. The emitter/detector pair can be implemented, for example, with an infra red beam and detector, or small laser or other light beam and photo detector, or even via acoustic or electromagnetic techniques. Such transmitter/receiver combinations are well known in the art and the particular type utilized is not critical to the invention.

A similar emitter is placed at the end of the portion of the train's path where projection is desired and serves to deactivate the projection device by shutting down power.

The section of the tunnel wall 3 onto which the image is projected should preferably be covered with a diffuse reflecting paint or coating, which should probably be white to maximize the intensity of a multicolored image.

In an optional enhancement, a provision is made to turn off the projector 1 when the distance d is outside a set of extremes. For example, if an oncoming train is passing the train 2, the distance d would become very small and the projector should be turned off because it would be undesirable to project light from the projector 1 into the windows of the passing train. Additionally, if the train 2 were to travel over a portion of a track which is outdoors rather than underground, it would be desirable to turn off the projector. Therefore, the guidance unit 5 or the distance measurer 7 should include a switching device which turns off the projector when the distance d is greater than the maximum predetermined value or less than a minimum value.

FIG. 2 shows an additional embodiment of the present invention. The arrangement of FIG. 2 includes a laser projector 21 in place of the conventional projector. The arrangement of FIG. 2 is shown as projecting the image on the opposite wall from that of FIG. 1.

A laser projector 21 is known in the art and comprises a laser source and an x-y scanner which scans the laserbeam to form the image. Since the laserbeam has a low level of scattering, the light point on the tunnel wall is always in focus and the images or animation achieved by the guidance of the laser are sharply focused independent of the distance from the tunnel wall to the vehicle, and further, without the need for additional and expensive lenses. By using a white laser light, the laserbeam can be selectively dissected into its spectral colors during portions of the scan, thereby producing a colored laser projection on tunnel wall 3.

An alternative technique for adjusting the height of the projection onto the tunnel wall 3 is shown in FIG. 2. A maneuverable projector 21 is attached to an upper part of the vehicle 2 at an axis which is perpendicular to the middle axis 8 of the projection. The movement of the projector 21 can then be accomplished by means of hydraulic cylinder 89 and swivel connector 79 which are moved by the digital guidance unit 5. Other possible arrangements for redirecting the output from the laser projector can include stepper motors.

It should also be noted that the projection axis 8 can be altered by changing the orientation of the light being emitted from the laser projector rather than the orientation of the entire laser projector itself. Moreover, assuming that the projection does not cover the entire possible image area of the laser projector, the image position can be adjusted so that the image height may be varied as desired.

The slope of the image's middle axis 8 in relation to the horizontal is to be adjusted in accordance with the distance values between the wall of the tunnel and the train as previously described.

As an optional enhancement, additional distance measuring device 7' is shown in FIG. 2 installed slightly above the original distance measuring device 7. Two distant measuring devices will assist in more clearly focusing the image if the tunnel wall is sloped. Specifically, if the tunnel wall is sloped inward so that it is closer to the train at the top thereof than at the bottom the distant measuring device 7' will measure a smaller distance than that measured by distant measuring device 7. From the difference of these two distances, the angle of the slope to determine the effect of the slope corrected. The data values for the scanner steering for the generation of the image are stored as a plurality of vectors. They are then combined with the values of the angles calculated from the distance as measured. Finally, the image is enlarged vertically by a factor of sin a, where a is the angle the tunnel wall makes with the horizontal.

FIG. 2 also depicts a device for the presentation of laser show effects. These laser show effects will be especially visible to passengers of the panorama compartments of trains, since these passengers are higher up and the roof of the train car is glassed. The lasershow effects may be used in conjunction with the projected advertisements to attract the viewers attention and to enhance the overall effect, thereby causing the viewer to better remember a particular sponsor.

In order to generate the laser show effects, a mirror 24 with an attached position emitting device 25 is necessary. The mirror is preferably spherical. On the train, a position recorder 26 receives signals and transfers them via signal lines to the digital guidance unit 5. The position recorder 26 can be constructed from position sensitive detectors for (for example those manufactured by the company Hamamatsu Photonics) by which four photo diodes are so connected with each other such that the x and y distance of the position emitting device 25 relative to the median point between these four photo diodes can be determined. Other techniques of determining the position can be utilized.

A further laser projector 21' is attached immediately next to the position recorder 26 and pointed toward the spherical mirror 24. Through the continuous measuring of the position of the spherical mirror 24 with respect to the position of the laser scanner, the laserbeam 27 can track the mirror during the ride as the train passes under the mirror. Additionally, an even more accurate reading of the relative location of the spherical mirror 24 with respect to the train can be determined by utilizing two distance measuring devices at particular angles relative to one another and then performing some simple calculations in a microprocessor.

The laserbeam may be scanned in a pseudorandom pattern above the train 2 and into spherical mirror 24. The beam and its reflections from the mirror 24 and from the dust particles in the air cause a lasershow effect similar to that displayed at rock concerts and other large gatherings.

Figure 3:
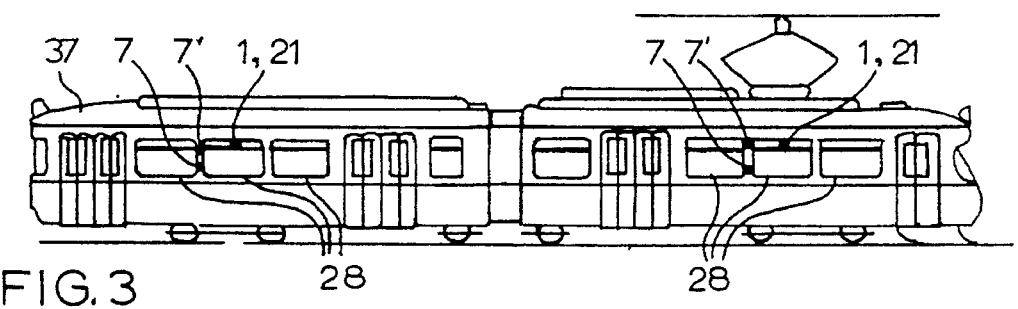
FIG. 3 is a side view of a street car with the invention installed thereon.

FIG. 3 shows a streetcar 32 equipped with the inventive devices. The projectors 1 and 21 are attached in the upper area in the middle of the windows 28. Each group of windows on each streetcar is equipped with a separate projector. The distance measuring devices for the measuring of both the distance and the slope of the wall onto which the images are projected are attached beside the windows. Since the projectors 1 and 21 are mounted at approximately the same height as that of the image, the swivel mechanism may be eliminated.

Figure 4:
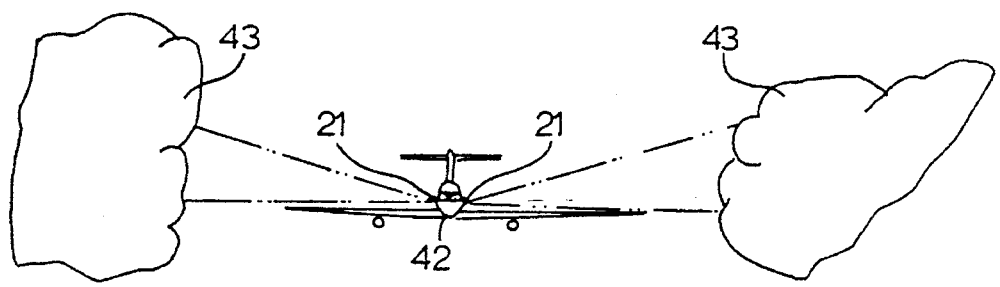
FIG. 4 depicts a flying aircraft with the invention utilized thereon to project images on clouds.

FIG. 4 shows a similar device attached on the sides of an airplane 42 and which may be utilized to project an image on the outsides of clouds 43 as the plane flies therethrough. The distance measuring device may be eliminated and the beam focused to display an image a predetermined distance from the plane. When the plane passes through cloud cover, the image will be viewable.

Figure 5:
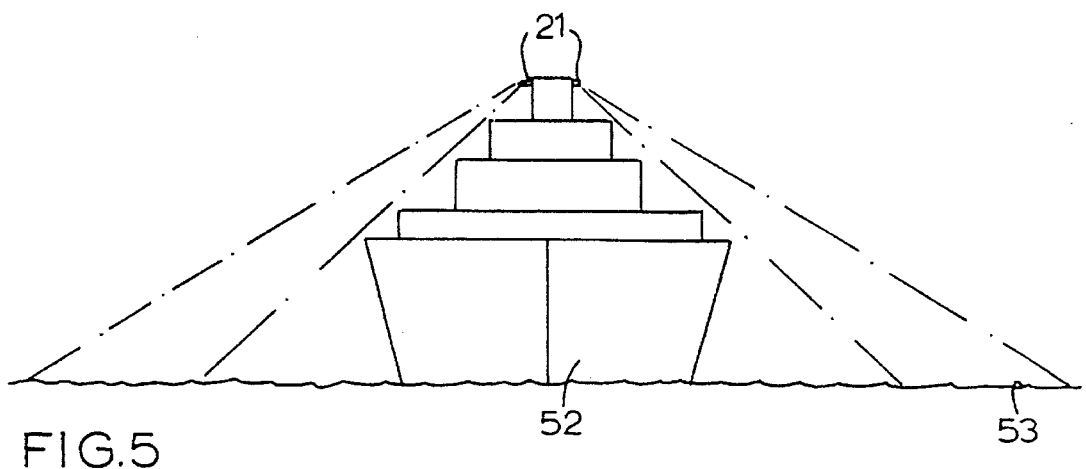
FIG. 5 is a depiction of a ship with the invention installed thereon.

Finally, FIG. 5 shows an additional adaptation of the invention wherein two projection cameras 21 are utilized on a ship 52 to project an image on the water surface 53.

It should be noted that while the above describes the preferred embodiments of the invention, there are other modifications and/or additions would be apparent to those of ordinary skill in the art. Such modifications and/or additions are intended to be within the scope of the following claims.

We claim:

1. Apparatus for displaying images to passengers of a moving vehicle comprising:

projecting means mounted on said vehicle for projecting an image onto a surface proximate to said vehicle; and means for adjusting the location of said image on said surface as the relative positions of said surface and said vehicle change such that said image remains conveniently viewable to passengers of said vehicle despite changes in said relative positions, wherein said projecting means is mounted on motion damping means.

2. Apparatus for displaying images to passengers of a moving vehicle comprising:

projecting means mounted on said vehicle for projecting an image onto a surface proximate to said vehicle;

means for adjusting the location of said image on said surface as the relative positions of said surface and said vehicle change such that said image remains conveniently viewable to passengers of said vehicle despite changes in said relative positions; and a digital guidance unit for calculating an adjustment to be made to said projecting means and for moving said projecting means to effectuate said adjustment.

3. Apparatus of claim 2 wherein said projecting means is a laser projector comprising a laser scanner.

4. Apparatus of claim 3 wherein said vehicle is a train and said surface is a tunnel wall.

5. Apparatus of claim 3 wherein said vehicle is a streetcar.

6. Apparatus of claim 3 wherein said vehicle is an airplane and said surface is the surface of a cloud.

7. Apparatus of claim 3 wherein said vehicle is a ship and said surface is the surface of a body of water.

8. Apparatus of claim 3 further comprising a distance measuring device for measuring the distance between said vehicle and said surface.

9. Apparatus according to claim 3 further comprising means for determining the start and end of a portion of said surface upon which said image is to be projected.

10. Apparatus according to claim 9 wherein said means for determining includes at least one emitter and at least one receiver of electromagnetic energy.

11. Apparatus of claim 9 wherein said means for determining includes at least one emitter and one receiver of acoustic energy.

12. Apparatus of claim 3 further comprising:

a spherical mirror mounted on said surface; and means mounted on said vehicle for determining the relative position of said spherical mirror with respect to said projecting means, and for aiming said projecting means at said spherical mirror.

13. Apparatus of claim 12 wherein said determining means comprises a plurality of photo diodes.

14. A method of projecting a viewable image for passengers within a moving vehicle comprising the steps of:

projecting the image on a surface proximate to said moving vehicle;

detecting changes in the position of said surface relative to said vehicle; and adjusting said projecting step in accordance with detected positional changes to cause the image to be continually correctly projected on the surface.

15. The method according to claim 14 wherein said adjusting step includes the step of a platform upon which a projector is mounted.

16. Apparatus for displaying an image to airplane passengers comprising;

means mounted on said airplane for projecting an image onto clouds; and means for maintaining the focus of the image onto clouds located a distance from the airplane.

17. An apparatus for displaying images to passengers of a moving vehicle comprising:

an image projector mounted on the vehicle for projecting an image outside the vehicle at a location in a passenger's line of view;

a sensing device mounted on the vehicle capable of monitoring changes in said location relative to the projector; and a digital guidance unit in communication with the sensing device for calculating an adjustment to be made to the projector and for moving the projector to effectuate appropriate adjustment, thereby maintaining desired focus of the image.

* * * * *